A. O. THOMPSON.
TRAP.
APPLICATION FILED APR. 25, 1908.

901,851.

Patented Oct. 20, 1908.

WITNESSES
E. M. Callaghan
Samuel E. Wade

INVENTOR
ANDREW O. THOMPSON
BY Munn & Co.
ATTORNEYS

UNITED STATES PATENT OFFICE.

ANDREW O. THOMPSON, OF WOLVERTON, MINNESOTA, ASSIGNOR OF ONE-HALF TO WILLIAM C. HUFF, OF WOLVERTON, MINNESOTA.

TRAP.

No. 901,851.     Specification of Letters Patent.     Patented Oct. 20, 1908.

Application filed April 25, 1908. Serial No. 429,157.

*To all whom it may concern:*

Be it known that I, ANDREW O. THOMPSON, a citizen of the United States, and a resident of Wolverton, in the county of Wilkin and State of Minnesota, have invented certain new and useful Improvements in Traps, of which the following is a specification.

This invention is an improvement in traps and consists in certain novel constructions and combinations of parts as will be hereinafter described and claimed.

Figure 1:
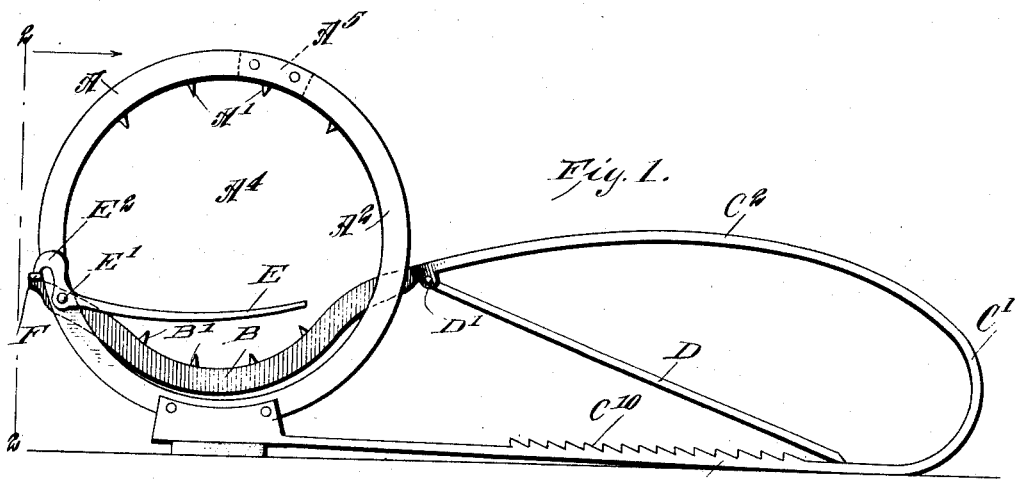
Figure 2:
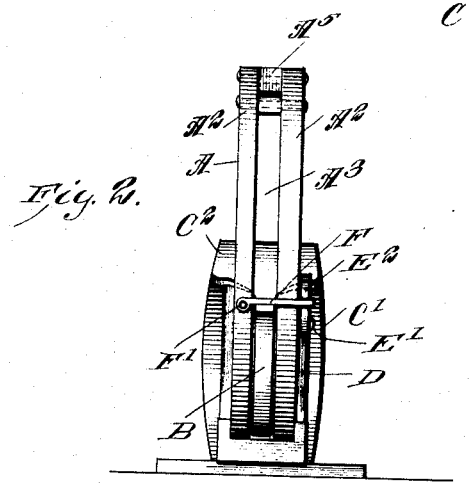
Figure 3:
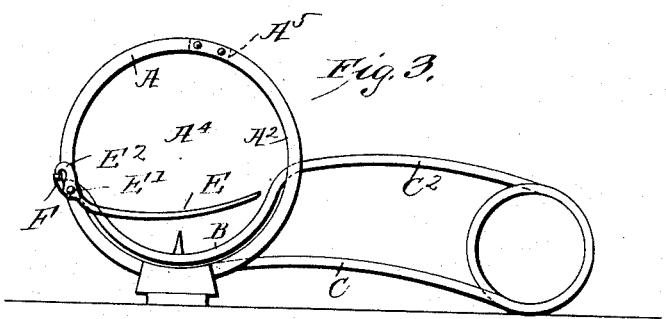

In the drawings, Figure 1 is a side view of a trap embodying my invention. Fig. 2 is an end elevation thereof, and Fig. 3 is a side view illustrating a somewhat different construction.

The trap as shown comprises the opposing jaws A and B, provided with spurs A' and B' and preferably reversely curved as shown.

The jaw A consists of two sections $A^2$ spaced apart at $A^3$ forming an intermediate slot in which the jaw B operates, and the said jaw B operates in the same plane with the jaw A, and extends within the slot $A^3$ across the circular space $A^4$ within the jaw A, as best shown in Fig. 1 of the drawing. The jaw A is arranged at one end of the base C, whose other end is upturned at C', and continued forming the arm $C^2$, as shown, and is provided with a dog D, pivoted at one end at D' to the arm $C^2$, and arranged at its other end to engage ratchet teeth $C^{10}$ on the base C. This construction is especially desirable in large or heavy traps for catching large or strong game, as it prevents the game from pushing the jaws apart and escaping after the jaws have once been sprung. The jaw A it will be noticed is in circular form, and the jaw B' extends diametrically across the same, and operates in the slot between the side sections of the jaw A, as shown in Fig. 1.

When the trap is set as shown in Fig. 1, the jaw B will be pushed away from the teeth or spurs of the jaw A, and will be held by the trigger E in the form of a bar pivoted at E', and having an upwardly projecting arm $E^2$ engaging with a pin F pivoted at one end at F', and adapted to be carried over the jaw B and across the slot $A^3$ with its free end engaged by the upwardly extended arm of the trigger, as shown in Figs. 1 and 2. This arm of the trigger may preferably be curved into hook form as shown in Figs. 1 and 2, and the body of the trigger E may be curved to conform generally to the curvature of the jaw B.

In operation when the trap is set as shown in Fig. 1, if an animal passing through the ring-shaped jaw A, treads on the trigger E it will release the trap and permit the jaws to spring toward each other thus impaling the animal and instantly killing the animal, thus making the trap humane.

The pin, teeth, or spurs A' are provided on both sections of the jaw A.

A stop block $A^5$ may be provided between the sections $A^2$ at the top of the trap to prevent the jaw B from jumping out at such point when the trap is sprung.

In Fig. 3 I show a trap which can be cheaply made of spring wire and will be found useful in making the small sizes of traps.

I claim—

1. The trap herein described, comprising a base having a ring-shaped jaw at one end composed of two sections spaced apart forming a slot between, the other end of the base being upturned and extended forming an arm, a jaw carried by said arm and curved reversely to the first said jaw, and a trigger for holding said jaws apart, the jaws being provided with opposing teeth or spurs, a dog carried by the jaw supporting arm, and ratchet teeth on the base for engagement by said dog, substantially as set forth.

2. A trap including a ring-shaped jaw composed of sections spaced apart forming an intermediate slot, and an opposing jaw operating in the said slot.

3. The combination in a trap of a base having ratchet teeth, a ring-shaped jaw on one end of the base and having sections spaced apart, an opposing jaw operating in said space between the sections of the first jaw, an arm carrying said opposing jaw, and provided with a dog engaging with the ratchet on the base, and a trigger for holding said opposing jaw, substantially as set forth.

4. The combination in a trap of a ring-shaped jaw composed of sections side by side, an opposing jaw operating between said sections and in a direction parallel to the planes thereof, and trigger devices for holding the jaw, substantially as set forth.

5. The combination in a trap of the main jaw and an opposing jaw, a pivoted trigger having a body portion and an arm projecting beyond the pivot and having a hooked portion, and a pin pivoted to the main jaw and extending transversely across the opposing jaw and engaging with the hooked portion of the trigger arm, substantially as set forth.

6. The combination in a trap, of a ring-shaped jaw composed of sections spaced apart forming an intermediate slot, an opposing jaw operating in the said slot, a pin pivoted to one of the sections of the main jaw and adapted to extend across the intermediate slot between the said sections and laterally beyond the other section, and a trigger having means engaging with the free end of the said pin whereby to secure the same.

7. A trap comprising a jaw composed of two sections side by side and similarly curved and spaced apart for the operation between them of an opposing jaw, and an opposing jaw operating between the sections of the first jaw and operating in a plane parallel with those of the said sections, and trigger devices for holding the said jaws apart and for releasing the same.

ANDREW O. THOMPSON.

Witnesses:
W. C. HUFF,
MATH OLSON.